United States Patent
Ogborn et al.

(10) Patent No.: US 10,614,512 B1
(45) Date of Patent: Apr. 7, 2020

(54) INTERACTIVE USER INTERFACE

(71) Applicant: AMAZON TECHNOLOGIES, INC., Seattle, WA (US)

(72) Inventors: Kenneth Ryan Ogborn, Seattle, WA (US); Anoop Balakrishnan, Seattle, WA (US); Joshua Jacob Slimp, Seattle, WA (US)

(73) Assignee: AMAZON TECHNOLOGIES, INC., Seattle, VA (US)

( * ) Notice: Subject to any disclaimer, the term of this patent is extended or adjusted under 35 U.S.C. 154(b) by 496 days.

(21) Appl. No.: 15/274,909

(22) Filed: Sep. 23, 2016

(51) Int. Cl.
  *G06Q 30/00* (2012.01)
  *G06F 17/30* (2006.01)
  *G06Q 30/06* (2012.01)
  *G06F 3/0484* (2013.01)
  *G06F 3/01* (2006.01)
  *G06F 3/0488* (2013.01)

(52) U.S. Cl.
  CPC ......... *G06Q 30/0643* (2013.01); *G06F 3/017* (2013.01); *G06F 3/0488* (2013.01); *G06F 3/04842* (2013.01)

(58) Field of Classification Search
  CPC .................................................. G06Q 30/0643
  See application file for complete search history.

(56) References Cited

U.S. PATENT DOCUMENTS

| | | |
|---|---|---|
| 5,960,411 A | 9/1999 | Hartman et al. |
| 7,479,949 B2 * | 1/2009 | Jobs ...................... G06F 3/0488 345/173 |
| 7,720,712 B1 | 5/2010 | Allocca et al. |
| 8,364,551 B1 | 1/2013 | Vippagunta |
| 8,626,665 B2 | 1/2014 | Bui |
| 9,047,607 B1 | 6/2015 | Curial et al. |
| 9,092,817 B2 | 7/2015 | Allocca et al. |
| 9,773,245 B1 | 9/2017 | Patel et al. |
| 2015/0242859 A1 * | 8/2015 | Viswanath ....... G06Q 20/40145 705/44 |

OTHER PUBLICATIONS

Talking about their generation. (2011). Retail Week, Retrieved from https://search.proquest.com/docview/875627592?accountid=14753.*

(Continued)

*Primary Examiner* — Kathleen Palavecino
(74) *Attorney, Agent, or Firm* — Lindauer Law, PLLC

(57) ABSTRACT

Described are techniques for providing an interactive user interface configured to receive at least two types of user input, such as a tap gesture and a swipe gesture provided to a control region of the user interface. Responsive to the first type of user input, a first process may be performed, such as adding an indication of an item to an electronic list for a future purchase. Responsive to the second type of user input, a second process may be performed, such as the immediate purchase of an item based on stored shipping and payment data. In some cases, data associated with a process may be accessed responsive to the initiation of user input, but the process may not be initiated until the user input has been completed. Modifications to characteristics of the process may be changed responsive to additional user input provided to the control region.

20 Claims, 7 Drawing Sheets

(56) References Cited

OTHER PUBLICATIONS

Lausier, Annie, "Amazon Swipe-to-buy Feature on IOS", Retrieved from the Internet: <hilps://twitter.com/annie/status/721758734322524160>.

Wroblewski, Luke, "Design is Never Done, Swipe to Buy Pattern", Retrieved from the internet: <https://plus.google.com/+LukeWroblewski/posts/eqUcQRk19EQ>.

U.S. Appl. No. 14/693,771 entitled "Preferred Payment Type Prediction," filed Apr. 22, 2015.

\* cited by examiner

INTERACTIVE USER INTERFACE

BACKGROUND

User interfaces may include buttons or other features that may cause processes to be performed responsive to user input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
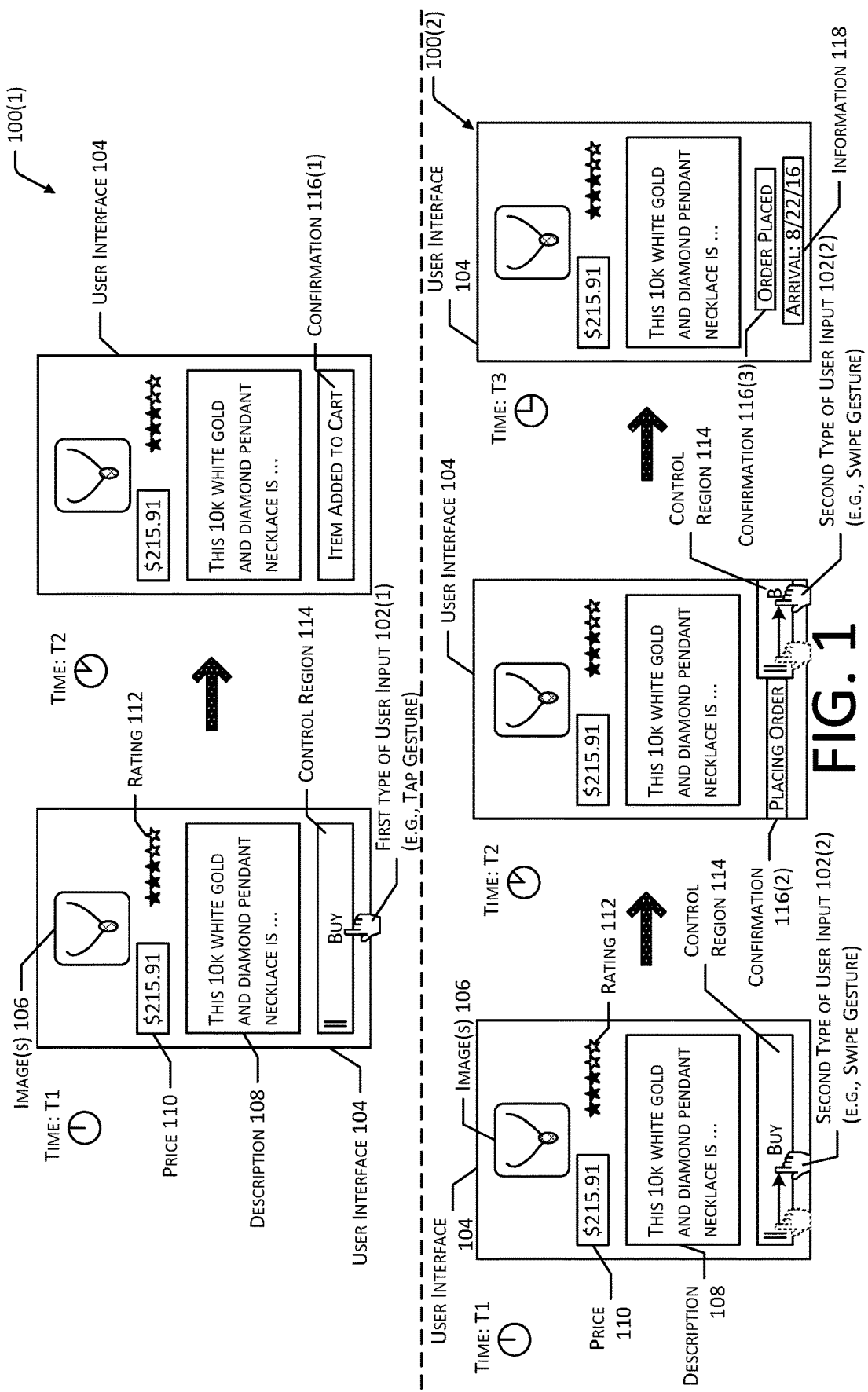
FIG. 1 depicts two example scenarios in which different types of user input are provided to a user interface to cause performance of different processes.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

User interfaces may include a variety of interactive and non-interactive elements. Non-interactive elements may include text, images, audio or haptic output, or other types of content that may be presented to a user but are not configured to receive user input or interaction. Interactive elements may include buttons, menus, links, scroll bars or other navigational elements, and so forth, any of which may be configured to receive some manner of user input, responsive to which a process may be initiated or an output may be generated. The processes performed responsive to user input may include initial portions of a larger workflow, such as requesting or retrieving data and preparing the data for a future transaction. The processes may also include immediate actions, such as the performance and completion of a transaction responsive to a single press of a button. For example, a webpage associated with an item available for purchase may include one or more of text, images, audio, or haptic elements that depict or describe characteristics of the item. The webpage may also include interactive elements, such as buttons that may be used to purchase the item, add the item to an electronic shopping cart, add the item to one or more electronic lists, provide a rating or review associated with the item, and so forth. Continuing the example, the webpage may include a first button that is used to add the item to an electronic shopping cart. Subsequent user input associated with the electronic shopping cart may be used to complete a purchase of the item at a future time. A second button included in the webpage may be used to immediately purchase the item. For example, responsive to user input associated with the second button, a system may determine preexisting shipping and payment data associated with a user account and complete a purchase transaction based on that data.

In some cases, a user may inadvertently cause an immediate process to be performed and completed, such as the unintentional purchase of an item. For example, the presence of multiple, similar buttons or other elements within a user interface may cause some users to inadvertently provide user input to an unintended button. Additionally, when the user input used to complete an immediate process is a non-complex type of input, such as clicking or tapping the button, a user may unintentionally provide this input during normal operation of a user device.

Described in this disclosure are techniques to reduce the likelihood that a user may inadvertently cause an immediate process to be performed by providing a user interface including features that receive specific types of input to perform corresponding processes. For example, a user interface provided to a user device may include a control region that is configured to receive at least two types of user input and cause different processes to be performed based on the type of user input that is received. One example of a user interface may include a webpage associated with an item available for purchase that displays item data indicative of one or more characteristics of the item. The control region within the user interface may include a button or other area configured to receive user input. In other implementations, the control region may include an element in the user interface associated with item data or other information provided to the user. For example, the price or image associated with an item available for purchase may also function as a control region that may be used to purchase the item by providing user input thereto.

A first type of user input provided to the control region, such as a tap gesture associated with a touch sensor or a click associated with a mouse device, may cause performance of a first process, such as adding an indication of the item to an electronic shopping cart or other type of electronic list associated with the user account accessing the user interface. A second type of user input, such as a swipe gesture associated with a touch sensor or a drag gesture associated with a mouse device, may cause performance of a second process, such as the immediate purchase of the item. For example, the second process may include accessing payment data and shipping data associated with the user account accessing the user interface, then initiating a process to purchase the item based on the payment data and shipping data. Providing a single control region that may be used to purchase an item, rather than multiple buttons, may prevent a user from inadvertently interacting with an unintended button. Additionally, associating a complex type of user input, such as a swipe gesture, with an immediate process, such as the purchase of an item, may reduce the likelihood that a user may inadvertently cause performance of the immediate process by providing the associated type of user input.

In some implementations, a first portion of a process may be performed responsive to an initial portion of a user input. For example, responsive to the initiation of a swipe gesture to purchase an item, payment and shipping data associated with a user account may be accessed. However, a second portion of the process, such as completion of the purchase, may not be performed until the swipe gesture or other user input is completed. In some implementations, completion of a swipe gesture may be determined based on one or more threshold values. For example, a swipe gesture may be determined to be completed if the swipe gesture spans a distance of at least eighty percent of the width of the control area or eighty percent of the width of a display used to present the user interface. As another example, a swipe gesture may be determined to be completed if the swipe gesture occurs for at least a threshold duration. As yet another example, a swipe gesture may be determined to be completed if the swipe gesture is performed using at least a threshold velocity or acceleration. Other threshold values may be used in association with other types of user input. For example, a tap gesture may be determined to be completed if the tap occurs for at least a threshold duration, or if the tap contacts a touch sensor with at least a threshold force. Additional example types of user input may include rotating or tilting a user device, shaking or otherwise moving the user device, tapping a rhythmic pattern or sequence of locations on a touch sensor or within a user interface using a mouse device, drawing a pattern or shape using a swipe or drag gesture, and so forth. Threshold values associated with such user input may include threshold positions, velocities, accelerations, locations on the user device or within the user interface, and so forth.

In some implementations, the control region of the user interface may be configured to accept more than two types of user input. For example, a third type of user input may include shaking a user device or performing a swipe gesture in a direction other than the direction of the swipe gesture used to purchase an item. Responsive to the third type of user input, one or more characteristics of the performed process may be modified. For example, shaking the user device or swiping in a direction opposite that of the swipe gesture used to purchase an item may be used to cancel the purchase. As another example, after swiping a control region in a horizontal direction to purchase an item, the control region may display information regarding the purchase, such as a shipping method or arrival date. Swiping in a vertical direction within the control region may allow a user to select different shipping methods. In some cases, user input associated with information regarding a process may cause a second user interface to be presented, the second user interface configured to allow a user to modify characteristics of the process. For example, after swiping a control region to purchase an item, the control region may display a purchase confirmation or one or more characteristics of the purchase. Tapping the displayed information in the control region may cause a second user interface to be presented, the second user interface including various fields, menus, buttons, selectors, and so forth that may be used to modify the purchase characteristics.

In some implementations, one or more characteristics of the control region may be determined based on data associated with a user account. For example, user data may include a purchase history, search history, browsing history, or indication of previous processes performed responsive to user input by a user account. The particular processes that may be performed using the control region may be determined based on the user data. For example, a user may rarely purchase items but frequently add items to electronic lists. Based on user data indicating this behavior, the control region may be configured such that tapping the control region adds an item to a first electronic list, while swiping the control region adds an item to a second electronic list. In some cases, user data may indicate gestures or other types of user input previously provided by a user associated with a user account. The particular types of user input that may be accepted by the control region may be determined based on the user data. For example, a user may frequently perform various tapping patterns using a touch sensor, but may only rarely use swipe gestures. Responsive to this determination, the control region may be configured to perform a first process responsive to a tap gesture having a first duration and a second process responsive to a tap gesture having a second, longer duration. In other implementations, user data may include user settings or preferences or geographic location information. For example, a user may configure particular types of user input and processes. As another example, a default type of user input for users in the United States may include a swipe gesture moving from left to right, while a default type of user input for users in Israel may include a swipe gesture moving from right to left.

Configuration of a portion of a user interface to accept multiple types of user input, each of which may be associated with a different process, may enable more intuitive and efficient user interactions with the user interface. Additionally, associating specific types of user input, that are unlikely to be performed inadvertently, with definitive or immediate processes, such as the immediate purchase of an item, may reduce inadvertent performance of processes, prevent consumption of computing and financial resources associated with cancelling or reversing erroneous processes, and so forth.

User interfaces within the present disclosure may improve the ability of computing devices to display information and interact with users through the use of control regions that may receive different types of user input and cause different processes to be performed based on the type of user input received. Such user interfaces may solve problems existing in prior graphical user interfaces in the context of content browsing, searching, and purchasing of items (e.g., in an e-commerce environment) using a mobile device with a touch interface, or other types of input devices. The efficiency, accuracy, and user experience associated with a user interface having such a control region may be improved when compared to conventional user interfaces. Additionally, by associating particular types of user input with particular processes and consolidating multiple conventional buttons or other input features into a single control region, the likelihood of an online consumer inadvertently performing an undesired action may be reduced, while the user may be able to more quickly intuitively cause one or more processes to be performed through use of the control region.

FIG. 1 depicts two example scenarios 100 in which different types of user input 102 are provided to a user interface 104 on a user device to cause performance of different processes. Specifically, in a first scenario 100(1), a first type of user input 102(1), such as a tap gesture, is provided to cause performance of a first process, while in a second scenario 100(2), a second type of user input 102(2), such as a swipe gesture, is provided to cause performance of a second process.

The user device on which the user interface 104 is presented may include any type of computing device including, without limitation, laptop computers or other personal computers, smartphones or other mobile devices, set-top boxes, tablet computers, wearable computers, automotive computers, and so forth. For example, the user interface 104 may be presented on a display associated with a smartphone or tablet computer, and the display may include a touch sensor for receiving user input 102. In some cases, the touch sensor may be configured to determine a pressure or force associated with the user input 102 in addition to a location of the user input 102 on the touch sensor. As another example, the user interface 104 may be presented on a display associated with a personal computer, which may be associated with one or more input devices such as keyboards, mouse devices, and so forth. In some implementations, a user device may include a microphone, and the user input 102 may include audio input. In other implementations, a user device may include a gyroscope, accelerometer, or other type of movement or location sensor, and the user input 102 may include moving the user device or positioning the user device in a selected location or orientation.

The example user interface 104 depicted in FIG. 1 includes a webpage displaying information associated with an item available for purchase, which may be presented on a user device. For example, the user interface 104 may include item data associated with various characteristics of the item, such as one or more images 106 depicting the item and a description 108 of the item, which may include alphanumeric data describing one or more characteristics of the item. The item data may also include a price 110 associated with purchase of the item, a rating 112 associated with the item, which in some cases may be determined based on user reviews, user-provided scores, and so forth. In some implementations, one or more of the image(s) 106, description 108, price 110, or rating 112 may include dynamic elements, interactive elements, or may otherwise be configured to receive user input 102. For example, selecting a region within the rating 112 may allow a user to provide a score associated with the item or cause a second user interface associated with the entry of user reviews and scores to be presented on the user device. As another example, user input 102 provided to one or more images 106 may enable the image(s) 106 to be rotated, enlarged, reduced, or otherwise modified to facilitate viewing of the item. As yet another example, user input 102 provided to one or more portions of the description 108 may enable selection of different options or characteristics associated with the item, such as size, color, and so forth. In some cases, selected options may cause the presented image(s) 106, description 108, price 110, or rating 112 to change to reflect the selected options. In some implementations the user interface 104 may also be configured to output audio data, video data, haptic data, and so forth.

The user interface 104 may include a control region 114 that may be configured to receive different types of user input 102 and cause different processes to be performed based on the type of user input 102 that is received. For example a first type of user input 102(1) may include a tap gesture provided using a touch sensor, a click provided using a mouse device, or a similar type of user input 102. A second type of user input 102(2) may include a swipe gesture provided using a touch sensor, a drag gesture provided using a mouse device, or another similar type of user input 102. In other implementations, the control region 114 may be configured to receive other types of user input 102, such as touching or selecting the control region 114 with a gesture having a short or long duration, tapping a rhythmic pattern in the control region 114, drawing a shape within the control region 114, and so forth. Each type of user input 102 provided to the control region 114 may cause a different process to be performed. In some implementations, multiple types of user input 102 may cause the same process to be performed. In other implementations, a single type of user input 102 may cause multiple processes to be performed.

Inclusion of a first section within the user interface 104 that includes item data detailing information regarding an item, adjacent to a control region 114 that may be used to perform one or more processes associated with the item, may enable users to efficiently and accurately make decisions when interacting with a user interface 104. In some cases, the user interface 104 may also include instructions indicative of the functionality of the control region 114, such as descriptive text at or near the location of the control region 114 or text that may appear when a user's touch is detected at or near the location of the control region 114. As such, the user interface 104 may improve the ability of a computing device to display information and interact with users.

In the first scenario 100(1), the control region 114 is shown as a button, defined by a visible boundary that enables the control region 114 to be visually differentiated from other portions of the user interface 104. The control region 114 may be used to purchase an item associated with the user interface 104. For example, the control region 114 may include a button labeled with the text "Buy", indicating that by providing user input 102 to the button, a purchase process may be performed. The first type of user input 102(1), illustrated in the first scenario 100(1) may include a tap gesture provided to a touch sensor at a location corresponding to the control region 114 (e.g., within the boundary of the button). Responsive to the receiving the first type of user input 102(1) at a first time (T1), an indication of the item may be added to an electronic shopping cart associated with a user account. At a second time (T2), a confirmation 116(1) may be provided to the user interface 104 at or near the location of the control region 114. For example, the confirmation 116(1) may include text indicating the process that was performed, such as "Item Added to Cart". In other implementations, the confirmation 116(1) may be provided to other locations within the user interface 104, the user device may be provided with a second user interface 104 that confirms the performance of the process corresponding to the first type of user input 102(1), or the confirmation 116(1) may include other types of data, such as audio or haptic output. In some implementations, the confirmation 116(1) or other content provided to the user interface 104, subsequent to the addition of the item to the electronic shopping cart, may be used to navigate to the electronic shopping cart to complete the purchase of the item. For example, the confirmation 116(1) or other content may function as a link that causes generation of an additional user interface 104 associated with a purchase process.

In the second scenario 100(2), the control region is also shown as a button having a boundary that visually separates the button from the remainder of the user interface 104. The button is labeled with the text "Buy", indicating that it may be used to purchase an item associated with the user interface 104. A second type of user input 102(2) may be provided to the control region 114 to cause a different process to be performed. For example, the second type of user input 102(2) may include a swipe gesture provided to a touch sensor at a location corresponding to the control region 114 (e.g., within the boundary of the button). In some implementations, the swipe gesture may include a directional component, such as movement from a left portion of the control region 114 toward a right portion of the control region 114. In other implementations, the control region 114 may be configured to cause a process to be performed responsive to any swipe gesture, independent of the direction thereof. In some implementations, the control region 114 may be configured to cause different processes to be performed depending on the directional component of a swipe gesture. For example, a swipe gesture that moves from a left side of the control region 114 to a right side may be used to purchase an item while a swipe gesture that moves from a top portion of the control region 114 toward a lower portion thereof may be used to modify a size, color, or quantity associated with the item.

In the example implementation shown in FIG. 1, the control region 114 may be configured to cause the immediate purchase of the item associated with the user interface 104. However, to prevent an unintentional purchase, the purchase process may only be completed after a swipe gesture has been completed. At a first time (T1), when a swipe gesture is initiated, an initial portion of a process may be performed. For example, responsive to a first portion of the user input 102(2), shipping data and payment data associated with a user account may be accessed. In other implementations, the shipping data and payment data may be accessed responsive to presentation of the user interface 104. For example, if a user has historically exhibited a tendency to purchase items immediately upon viewing a user interface 104, the shipping data and payment data for that user may be pre-fetched prior to receiving user input 102 from the user. In some implementations, if no shipping data or payment data for the user account has been previously stored, the swipe functionality of the control region 114 may be disabled. Alternatively, providing the second type of user input 102(2) to the control region 114 may cause performance of the first process illustrated in the first scenario 100(1). In other implementations, providing the second type of user input 102(2) to the control region 114 may cause a second user interface 104 to be provided to the user device, the second user interface 104 being configured to request shipping data and payment data.

At a second time (T2), responsive to receipt of the user input 102(2), the control region 114 may visibly change. For example, responsive to receipt of a swipe gesture, the control region 114 may appear to move in a direction corresponding to the directional component of the swipe gesture. In some implementations, a confirmation 116(2) indicating receipt of the first portion of the user input 102(2) may be presented in the user interface 104. For example, as the control region 114 appears to move in a lateral direction corresponding to the direction of the swipe gesture, a confirmation 116(2) may be displayed at or near the previous location of the control region 114. Continuing the example, FIG. 1 depicts the confirmation 116(2) including the text "Placing Order" to confirm that a purchase of the item will occur responsive to the user input 102(2). In some implementations, the text or other content associated with the confirmation 116(2) may dynamically scale as the swipe gesture is performed. For example, as the swipe gesture moves in a horizontal direction, a button depicted in the control region 114 may appear to move in the horizontal direction, while a space adjacent to the button is created by this movement. The text of the confirmation 116(2) may change in apparent size, shape, or scale to occupy this space as the space becomes larger throughout the swipe gesture, or smaller if the swipe gesture is released or reversed. In some implementations, however, if the swipe gesture or other type of user input 102(2) is not completed, the purchase or other process may not be initiated. For example, if a touch input having a lateral directional component is inadvertently provided to the control region 114, this touch input may initially be interpreted as a swipe gesture. However, if the swipe gesture does not have a length of at least a threshold distance, such as eighty percent of the width of the control region 114, or eighty percent of the width of the display of the user device, the corresponding process may not be performed. In other implementations, the threshold characteristics associated with the user input 102(2) may include a threshold duration, a threshold velocity or acceleration, or a threshold distance from one or more locations within the control region 114. In some implementations, one or more threshold values may be configurable. For example, a threshold may be selected by a user as a setting or preference. In other cases, a threshold may be determined based on user interactions for a particular user. For example, a particular user may exhibit a specific range of motion when performing a swipe gesture based on the size of the user's hand and the preferred position of the user's thumb or other digits when holding a device. The threshold distance for a swipe gesture may be determined based on one or more previous user interactions from which a user's range of motion may be determined.

At a third time (T3), completion of the second type of user input 102(2) may be determined, and the associated process may be performed. For example, responsive to a completed swipe gesture provided to the control region 114, a purchase transaction for the item associated with the user interface 104 may be completed based on shipping data and payment data associated with the user account. Continuing the example, responsive to completion of the swipe gesture, a request to purchase an item may be provided to a server or other computing device, and the server may access or request additional data used to complete the purchase transaction. U.S. Pat. No. 5,960,411, which is incorporated by reference herein in its entirety, describes example methods and systems that may be used to purchase items via the Internet, one or more of which may be used in conjunction with input received via a control region 114. A confirmation 116(3) indicating that the process has been performed, such as the text "Order Placed", may be presented at or near the location of the control feature 114. In other implementations, the confirmation 116(3) may be provided to other locations in the user interface 104, the user device may be provided with a second user interface 104 that confirms the performance of the process corresponding to the second type of user input 102(2), or the confirmation 116(3) may include other types of data, such as audio or haptic output. In some implementations, the user interface 104 may also be provided with additional information 118 associated with the process. For example, if the process includes the purchase of an item, the information 118 may include an arrival date or other information 118 associated with the shipment, payment, or other characteristics of the purchase. In some implementations, additional user input 102 may be provided to one or more of the confirmation 116(3) or the information 118 to modify one or more characteristics of the process. For example, a tap gesture or a swipe having a different directional component than the second user input 102(2) may be provided to the confirmation 116(3) to cancel a purchase. As another example, a swipe gesture provided to the information 118 may be used to scroll through shipping options or arrival dates associated with the purchase. As yet another example, a tap gesture provided to the information 118 may cause a second user interface to be presented to permit modification of shipping or payment options, modification of other characteristics of the purchase, or cancellation of the purchase.

While FIG. 1 depicts a user interface 104 and control region 114 associated with purchase of an item, other implementations may include control regions 114 configured to perform other types of processes. For example, in other implementations, the first type of user input 102(1) may include a swipe gesture, which may cause an immediate action, such as the addition an item to a default list when the swipe gesture is provided to the control region 114. The second type of user input 102(2) may include a tap gesture, which may cause a menu or other user interface 104 to be presented to enable selection from among multiple lists or creation of a new list. As another example, in another implementation, providing a first type of user input 102(1), such as touching and holding a feature associated with an item, may cause a menu or other user interface 104 associated with possible filters or options to be presented. Providing a second type of user input 102(2), such as a swipe gesture, may be used to modify one or more filters or options. Providing a third type of user input 102, such as a tap gesture, may cause the user interface 104 to focus or "zoom-in" on a selected element, such as an image 106.

Figure 2:
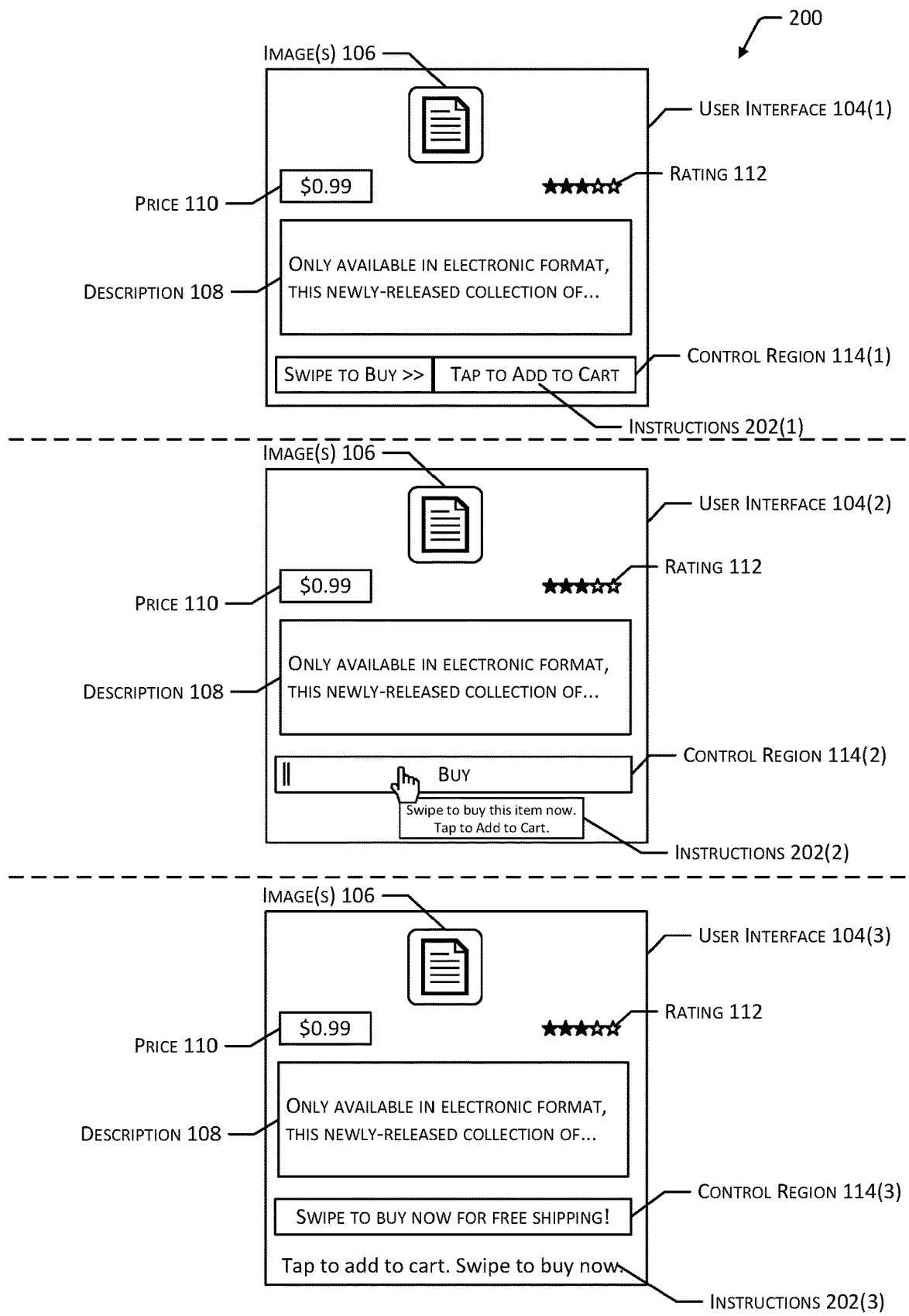
FIG. 2 is a block diagram illustrating example user interfaces within the scope of the present disclosure.

FIG. 2 is a block diagram 200 illustrating example user interfaces 104 within the scope of the present disclosure. Each user interface 104 is depicted having item data associated with an item available for purchase. For example, as described with regard to FIG. 1, item data may include one or more images 106 of an item, a description 108 (e.g., alphanumeric data) associated with the item, a price 110 of the item, and a rating 112 associated with the item. Other types of data presented in the user interface 104 may include audio data, video data, haptic data, and so forth. Each user interface 104 is also shown having a respective control region 114 with different characteristics.

A first user interface 104(1) is shown having a control region 114(1), defined by a visible boundary that separates the control region 114(1) from other portions of the user interface 104(1). The depicted control region 114(1) includes instructions 202(1) displayed thereon. For example, the control region 114(1) may include text or symbols indicating the types of user input 102 that the control region 114(1) is configured to accept and the processes that correspond to each type of user input 102. Continuing the example, the first control region 114(1) is shown including the textual instructions 202(1) "Swipe to Buy", followed by the directional symbols ">>", on a left side of the control region 114(1). This portion of the instructions 202(1) may indicate that a swipe gesture that proceeds from the left side of the control region 114 toward the right side thereof may be performed to purchase the item associated with the user interface 104(1). The instructions 202(1) may also include text depicted on a right portion of the control region 114 that reads "Tap to Add to Cart", which may indicate that performing a tap gesture within the control region 114 may cause the item associated with the user interface 104 to be added to an electronic shopping cart.

A second user interface 104(2) is shown having a control region 114(2), depicted as a bounded button that is labeled with the text "Buy". While the control region 114(2), itself, does not include textual instructions 202, the user interface 104(2) may display instructions 202(2) in the form of a tooltip, pop-up, or separate field. For example, the instructions "Swipe to buy this item now. Tap to add to cart." may appear if a mouse cursor is positioned over the control region 114(2) or if a user's finger interacts with a touch sensor at or near a position corresponding to the control region 114(2) (e.g., within the boundary of the control region 114(2)).

A third user interface 104(3) is shown having a control region 114(3), defined by a visible boundary, that is labeled with an incentive to encourage a user to purchase the item associated with the user interface 104. For example, the control region 104(3) may include the text "Swipe to buy now for free shipping!" As another example, the control region 104(3) could include text indicating a discount associated with the price 110, a discount associated with the price of other items, free items or services that may accompany the purchase of the item, and so forth. The user interface 104(3) is also shown including instructions 202(3) positioned near the control region 114(3) to describe the types of user input 102 and processes that may be performed using the control region 114(3). Specifically, the instructions 202(3) are shown including the text "Tap to add to cart. Swipe to buy now."

Figure 3:
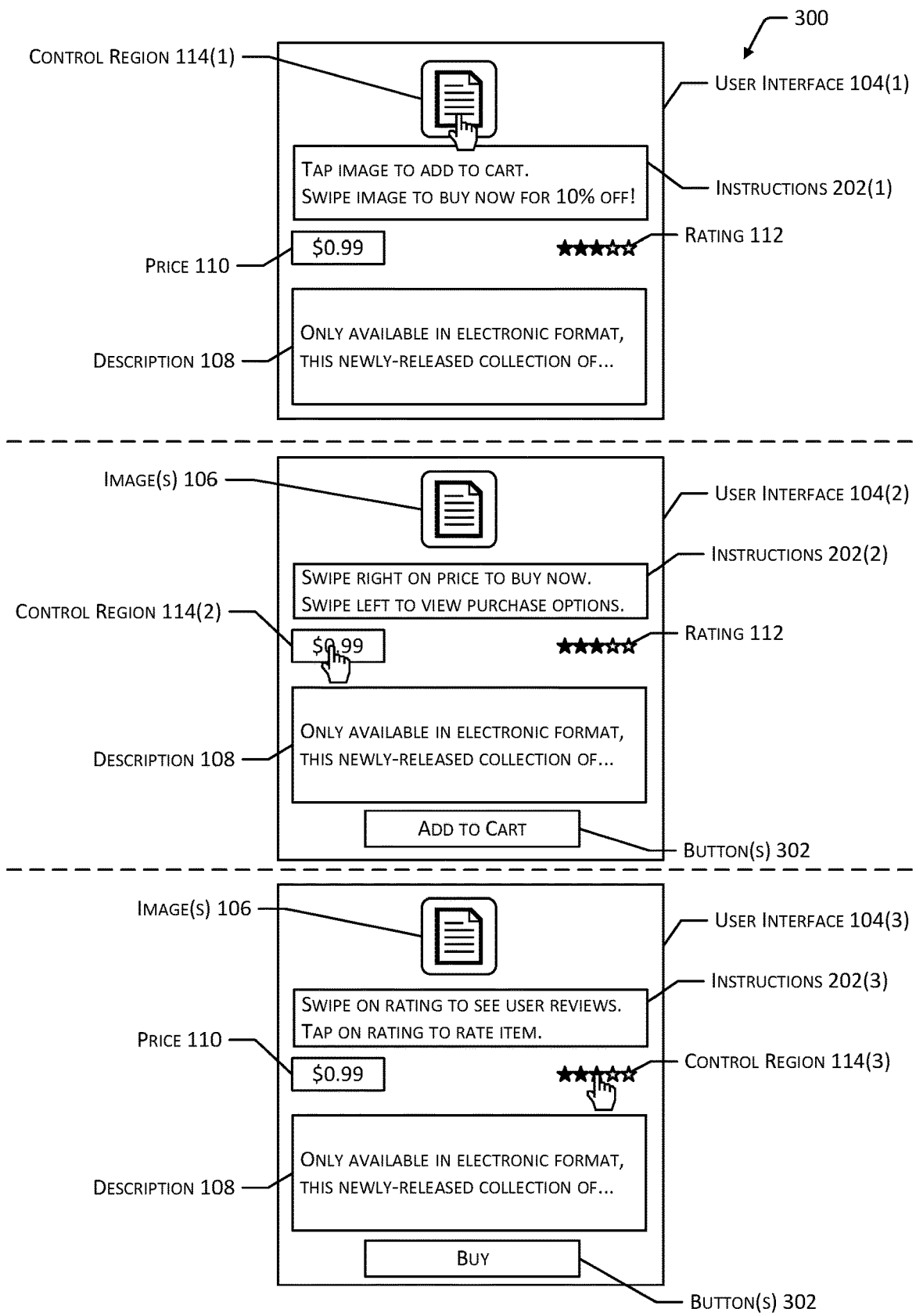
FIG. 3 is a block diagram illustrating example user interfaces within the scope of the present disclosure that include elements of item data as control regions.

FIG. 3 is a block diagram 300 illustrating example user interfaces 104 within the scope of the present disclosure that include elements of item data as control regions 114. A first example user interface 104(1) is shown that may include various types of item data associated with an item available for purchase, such as a price 110, a rating 112, a description 108 of the item, and so forth. The user interface 104(1) may also include one or more images 106 of the item, however, in the depicted first user interface 104(1), the image 106 may also function as a control region 114(1) that may be used to purchase the item. For example, the control region 114(1) may be configured to accept multiple types of user input 102, such as tap gestures and swipe gestures, and cause different processes to be performed based on the type of user input 102 received. Continuing the example, the control region 114(1) may cause the item to be added to an electronic shopping cart upon receipt of a tap gesture or other type of user input 102, and may cause the item to be purchased immediately upon receipt of a swipe gesture or other type of user input 102. In some implementations, the user interface 104(1) may include instructions 202(1) indicative of the functions of the control region 114(1). In some cases, the instructions 202(1) may include one or more incentives to encourage a user to purchase the item. For example, the instructions 202(1) may read "Tap image to add to cart. Swipe image to buy now for 10% off!"

In other implementations, other content presented in a user interface 104 may function as a control region 114. For example, FIG. 3 depicts a second example user interface 104(2) depicting item data, such as one or more images 106, a description 108 of the item, a rating 112, and so forth. The item data may also include a price 110, however in the example second user interface 104(2), the price 110 may function as a control region 114(2) configured to receive multiple types of user input 102. For example, performing a swipe gesture on the control region 114(2) in a first direction (e.g., from left to right) may cause performance of a first process, such as purchasing the time, while performing a swipe gesture in a different direction (e.g., right to left) may cause an additional user interface 104 associated with purchasing options to be presented. The user interface 104(2) may also include instructions 202(2) indicative of the functions of the control region 114(2), such as the text "Swipe right on price to buy now. Swipe left to view purchase options." One or more buttons 302 or other features of the user interface 104(2) may be used to perform other functions not associated with the control region 114(2), such as adding the item to an electronic shopping cart or other type of list. In other implementations, a user interface 104 may include multiple control regions 114. For example, user input 102 provided to the image 106 associated with an item may be used to modify the size, color, or quantity of an item to be purchased, while user input associated with the price 110 may be used to purchase the item immediately or add the item to an electronic shopping cart.

FIG. 3 also depicts a third example user interface 104(3) that includes item data, such as one or more images 106, a description 108 of the item, a price 110, and so forth. The item data may also include a rating 112 associated with the item, however, in the depicted third user interface 104(3), the rating 112 may function as a control region 114(3) configured to receive multiple types of user input 102. For example, upon receipt of a swipe gesture, the control region 114(3) may cause a user interface 104 associated with user reviews to be presented, while upon receipt of a tap gesture, the control region 114(3) may permit the user to provide a rating 112 associated with the item. The user interface 104(3) may include instructions 202(3) indicative of the functions of the control region 114(3), such as the text "Swipe on rating to see user reviews. Tap on rating to rate item." One or more buttons 302 may be used to perform other functions associated with the user interface 104(3), such as purchasing the associated item.

Figure 4:
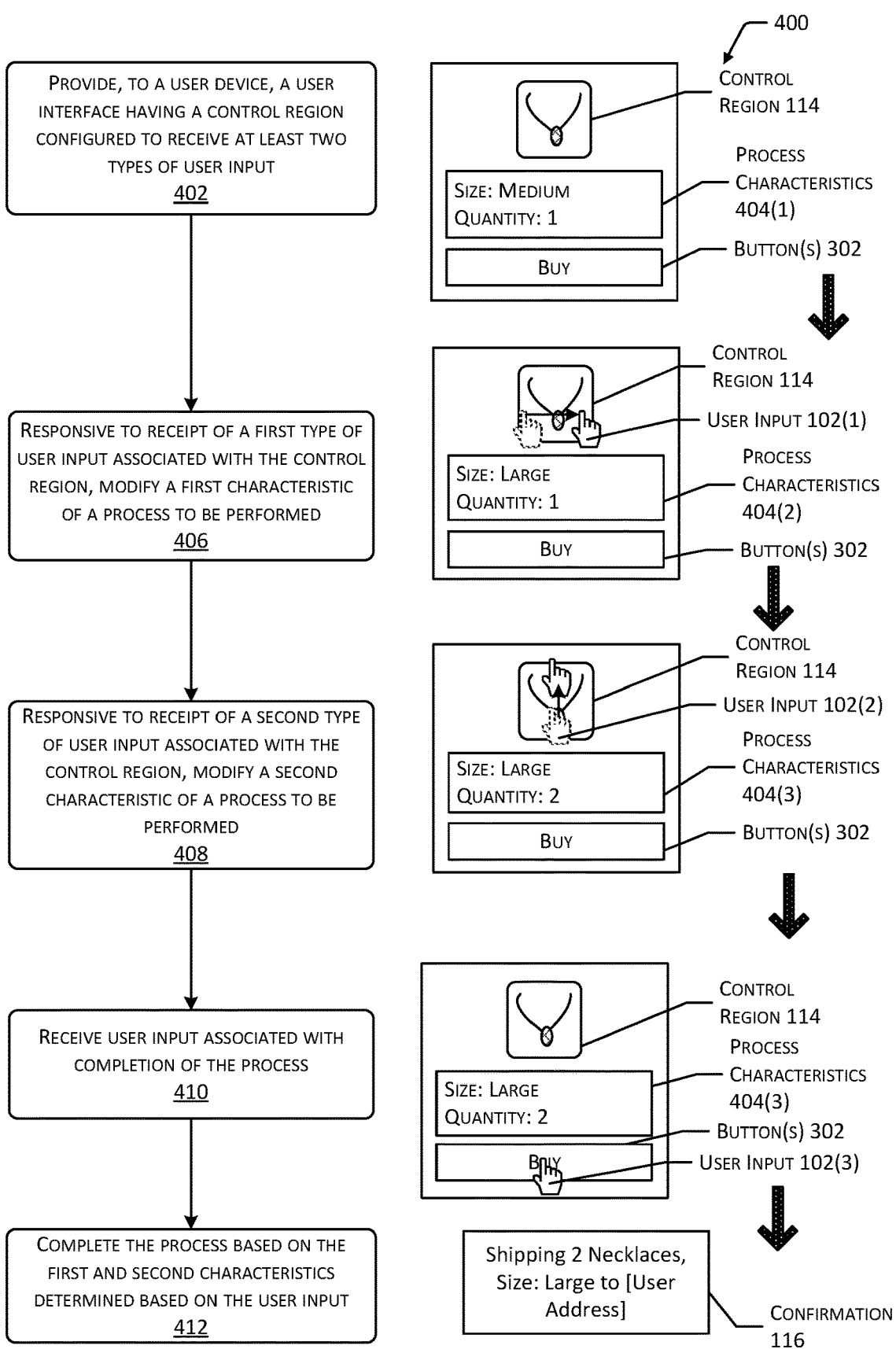
FIG. 4 is a scenario illustrating a method for modifying characteristics of a process based on user input to a control region of a user interface.

FIG. 4 is a scenario 400 illustrating a method for modifying characteristics of a process based on user input 102 to a control region 114 of a user interface 104. In the depicted scenario 400, the example process includes a purchase transaction associated with an item. However, in other implementations, characteristics of other types of processes may be modified based on user input 102 to a control region 114.

At 402 a user interface 104 may be provided to a user device, the user interface 104 including a control region 114 configured to receive at least two types of user input 102. For example, a user device may include a smartphone, a tablet computer, a notebook computer, a laptop computer, a desktop computer, or another type of computing device having one or more input devices, such as a touch sensor or mouse device. The user interface 104 may be presented on a display device associated with the user device. Continuing the example, a user device having a touch screen may include a touch sensor integrated with a display device, such that user input 102 in the form of a touch or gesture may be provided to a region of the touch sensor that corresponds to the location of the control region 114 on the display device.

As described with regard to FIGS. 1-3, the depicted user interface 104 may include item data associated with an item available for purchase, such as images 106, a description 108, a price 110, a rating 112, or other types of item data. In the depicted user interface 104, the control region 114 is incorporated within an image 106 of the item, such that user input 102 provided to the image 106 may cause one or more processes to be performed. In addition to the control region 114 and the item data, the depicted user interface 104 includes one or more process characteristics 404(1) associated with a process that may be performed using the user interface 104. For example, the process characteristics 404(1) may include a size (e.g., "Medium") and a quantity (e.g., "1") associated with the item. User input 102 provided to one or more buttons 302 may be used to complete a purchase of the item, while user input 102 provided to the control region 114 may be used to modify the process characteristics 404(1). In some implementations, the user interface 104 may include instructions 202 indicating the manner in which process characteristics 404 may be changed by providing user input 102 to the control region 114. For example, instructions 202 presented in the user interface 104 may read, "Swipe horizontally on image to modify size; Swipe vertically to modify quantity". In some implementations, the instructions 202 may be dynamically scalable to occupy portions of a user interface 104 that are not occupied by other text or content. In other implementations, the instructions 202 may be concealed from view until a user's touch is positioned proximate to the control region 114, which may be determined based on data received from a touch sensor associated with the device presenting the user interface 104. For example, the control region 114(2) shown in FIG. 2 may cause instructions 202(2) to be displayed responsive to proximity of a user's touch to the control region 114(2).

At 406, responsive to receipt of a first type of user input 102(1) associated with the control region 114, a first characteristic of the process to be performed may be modified. Continuing the example, the first type of user input 102(1) may include a swipe gesture provided to the control region 114, the swipe gesture having a first directional component, such as a swipe progressing from a left side of the control region 114 toward a right side thereof. Responsive to the user input 102(1), the characteristics of the process may be modified. For example, a horizontal swipe gesture may be used to modify a size associated with the item available for purchase. FIG. 4 depicts modified process characteristics 402(2) that include a size of "Large".

At 408, responsive to receipt of a second type of user input 102(2) associated with the control region 114, a second characteristic of the process to be performed may be modified. For example, the second type of user input 102(2) may include a vertical swipe gesture (e.g., progressing from a lower portion of the control region 114 toward an upper portion thereof). Continuing the example, a vertical swipe gesture may be used to modify a quantity of items to be purchased. Responsive to the user input 102(2), modified process characteristics 402(3) that include a quantity of "2" may be generated.

At 410, user input 102(3) associated with completion of the process may be received. For example, after providing user input 102 to the control region 114 to modify the process characteristics 404(3), a user may complete a purchase transaction having the desired process characteristics 404 by providing user input 102(3), such as a tap gesture, to a button 302.

At 412, the process may be completed based on the first and second characteristics determined based on the user input 102. For example, the user interface 104 of FIG. 4 depicts an image 106 of a necklace available for purchase, and the modified process characteristics 404(3) include a size of "large" and a quantity of "2" associated with the purchase transaction. Responsive to the user input 102(3) provided to the button 302, a purchase transaction for two necklaces having a size of "large" may be completed. In some implementations, a confirmation 116 of the process may be provided to the user interface 104 or to a separate user interface 104. The confirmation 116 may include an indication of one or more of the process characteristics 404.

Figure 5:
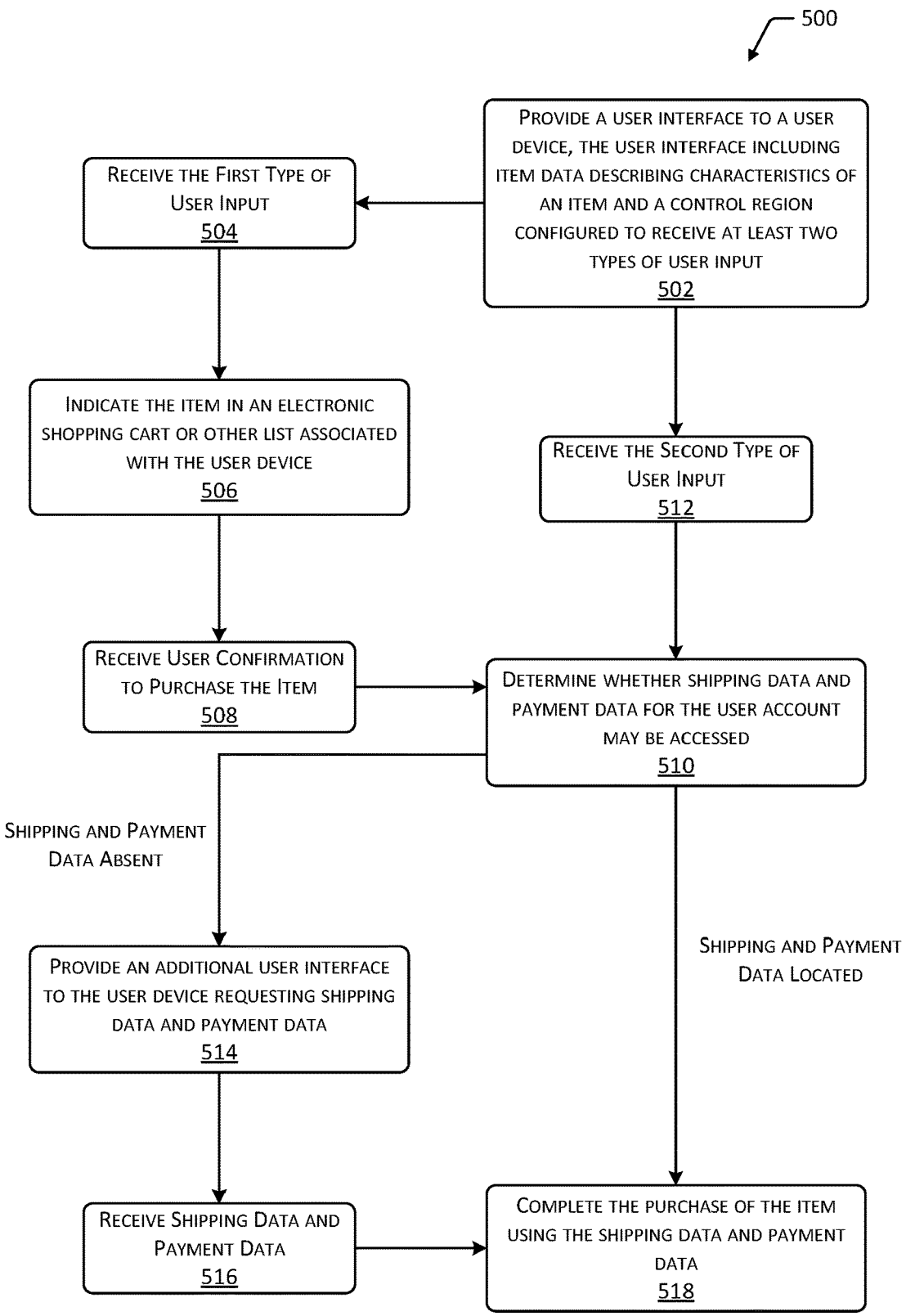
FIG. 5 is a flow diagram illustrating a method for completing a purchase of an item based on user input provided to a control region, shipping data, and payment data.

FIG. 5 is a flow diagram 500 illustrating a method for completing a purchase of an item based on user input 102 provided to a control region 114, shipping data, and payment data. Block 502 provides a user interface 104 to a user device. The user interface 104 may include item data describing characteristics of an item and a control region 114 configured to receive at least two types of user input 102. For example, item data may include one or more of an image 106, a description 108 of the item, a price 110, a rating 112, one or more reviews associated with the item, audio, haptic, or olfactory output indicative of characteristics of the item, and so forth. The control region 114 may include one or more buttons 302, sliders, or any other type of visible or invisible feature or location within the user interface 104. In some implementations, the control region 114 may include one or more elements of the item data. The types of user input 102 that may be received at the control region 114 may include tactile input, such as tap or swipe gestures, movement or selection using a mouse device, touchpad, trackball, game controller, keyboard, or other type of input device, movement of the user device such as by shaking, tilting, or rotating the device, audio input provided to a microphone, and so forth. The control region 114 may be configured to cause a first process to be performed responsive to receipt of a first type of user input 102 and a second process to be performed responsive to receipt of a second type of user input 102.

For example, block 504 may receive the first type of user input 102(1) at the control region 114. The control region 114 may be configured to cause a first process to be performed responsive to receipt of the first type of user input 102(1). Continuing the example, block 506 may cause the item to be added to an electronic shopping cart or other list associated with the user device. Block 508 may receive an additional user confirmation to purchase the item. For example, after an indication that an item has been added to an electronic shopping cart or other type of list, a user device may navigate to view a user interface 104 associated with the list then provide user input 102 to initiate a purchase transaction associated with the item. Block 510 may determine whether shipping data and payment data for the user account may be accessed to facilitate purchasing of the item.

If the second type of user input 102 is received, as indicated at block 512, the control region 114 may cause initiation of a process to immediately purchase the item based on stored shipping data and payment data, rather than adding an indication of the item to an electronic shopping cart or list. Thus, responsive to receipt of the second type of user input 102 at block 512, the method may proceed directly from block 502 to block 512 to block 510, which may determine whether shipping data and payment data for the user account may be accessed.

In some cases, shipping and payment data associated with a user account may be absent. For example, a user may not have previously provided shipping data or payment data, in which case, no shipping or payment data associated with the user account would be stored. In other cases, previous shipping and payment data may have been lost, deleted, corrupted, or outdated. For example, a system may be configured to periodically confirm or request new shipping and payment data for user accounts. In still other cases, a location where shipping and payment data associated with a user account are stored may be inaccessible, such as due to network irregularities. If shipping and payment data for a user account are absent, block 514 may provide an additional user interface 104 to the user device requesting shipping data and payment data. For example, a user interface 104 may include fields, menus, selectors, and so forth that may be configured to receive user input 102 corresponding to a shipping address, a credit or payment account, and so forth. Block 516 may receive the shipping data and payment data.

Responsive to receipt of shipping and payment data, the method may proceed to block 518, which may complete the purchase of the item using the shipping data and payment data. If shipping and payment data associated with the user account are able to be located, the method may proceed directly from block 510 to block 518, and the purchase of the item may be completed using the existing shipping data and payment data without soliciting additional data using an additional user interface 104.

Figure 6:
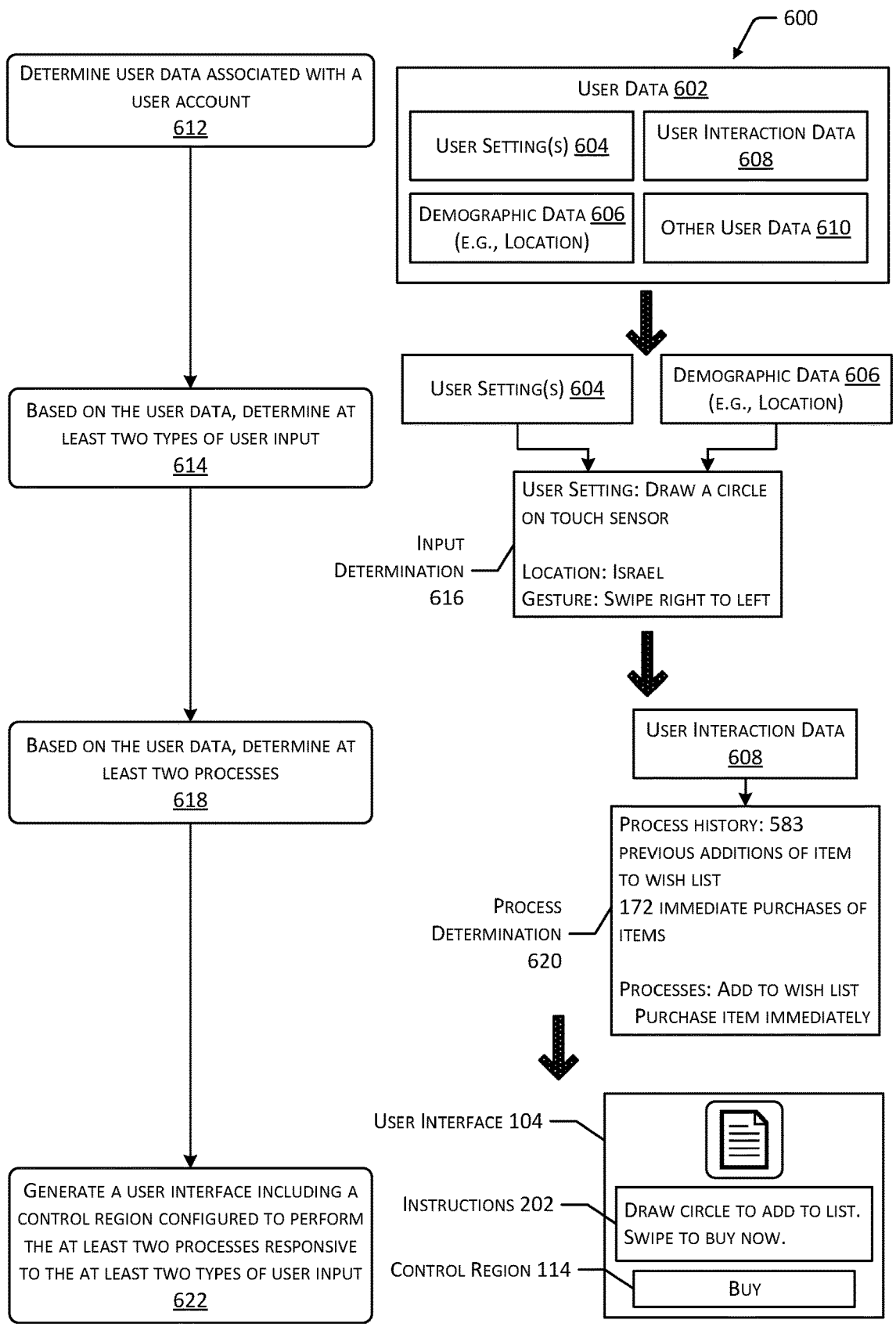
FIG. 6 is a scenario illustrating a method for generating a user interface and control region based on user data associated with a user account.

FIG. 6 is a scenario 600 illustrating a method for generating a user interface 104 and control region 114 based on user data 602 associated with a user account. User data 602 may include, for example, one or more user settings 604, preferences, and so forth, which may be determined based on user input 102. Continuing the example, a user may provide user input 102 indicating that the user prefers to use a swipe gesture that moves from a left side of a control region 114 toward a right side thereof to add an item to a particular list. In some implementations, user settings 604 may include one or more initial or default settings in the absence of user input 102 indicating other user settings 604 or preferences. For example, a default setting may indicate that a tap gesture provided to a control region 114 may be used to add an indication of an item to an electronic shopping cart.

User data 602 may also include demographic data 606 such as data indicative of an age, sex, location, or other characteristics of a user. In some implementations, demographic data 606 may be used to determine initial or default settings with regard to particular user interfaces 104 and control regions 114. For example, if a user resides in a location where the primary written language is read from right to left, a default type of user input 102 may include a swipe gesture that progresses from a right side of a control region 114 to a left side thereof. If the user resides in a location where the primary written language is read from left to right, the default type of user input 102 may include a swipe gesture that progresses from the left side of the control region 114 toward the right side.

User data 602 may further include user interaction data 608, which may include data indicative of previous user input 102 received from a user account. For example, user interaction data 608 may include one or more of a purchase history, a search history, or a browsing history associated with a user account. User interaction data 608 may also include an indication of one or more processes previously performed responsive to user input 102 received from a user account, such as purchases, additions of items to lists, and so forth. User interaction data 608 may further include indications of one or more types of user input 102 received from a device associated with a user account, such as various gestures using a touch sensor or mouse device, input received via a motion sensor, image sensor, or microphone, or other types of user input 102. Other user data 610 may include other characteristics of a user or user device. For example, other user data 610 may include an indication of input devices associated with a particular user device. Continuing the example, if a current user device used to access a user interface 104 lacks a touch sensor, a control region 114 configured to receive touch input may not be provided to the user device. As another example, other user data 610 may include an indication of times that previous user interactions occurred. Continuing the example, users that reside in a cold climate may be less likely to provide touch input to a touch sensor during winter months and more likely to provide user input 102 in the form of tilting, shaking, or positioning a user device.

At 612, the user data 602 associated with a user account may be determined. If stored user data 602 for a particular user account exists, the user data 602 may be accessed. If no stored user data 602 exists or if the stored user data 602 is insufficient to generate or configure a user interface 104, a prompt, request, or other user interface 104 may be provided to the user device requesting input of user data 602.

At 614, based on the user data 602, at least two types of user input 102 may be determined. For example, a user setting 604 may indicate that a user prefers to provide a touch gesture that includes drawing a circle within a control region 114 as one type of user input 102. As another example, demographic data 606 may indicate that the user resides in Israel, where the primary written language is read from right to left. As a result, a default type of user input 102 for this location may include a swipe gesture that moves from a right side of a control region 114 toward a left side thereof. An input determination 616 indicative of the types of input associated with the user data 602 may be generated and used to configure a control region 114.

At 618, based on the user data 602, at least two processes to be associated with the types of user input 102 may be determined. For example, based on user interaction data 608, it may be determined that a user account has previously added a large number (e.g., greater than a threshold quantity) of items to an electronic wish list, and has immediately purchased a large number (e.g., greater than a threshold quantity) of items without adding the items to any manner of electronic list or shopping cart. In some implementations the two or more processes that have historically performed the greatest number of times may be determined. In other implementations, the two or more processes that have been performed the greatest number of times within a recent time period, such as the previous month, may be determined. A process determination 620 indicative of the determined processes associated with the user data 602 may be generated and used to configure a control region 114.

At 622, a user interface 104 may be generated, the user interface 104 including a control region 114 configured to perform the at least two processes responsive to the at least two types of user input 102. The processes that are performed and the user input 102 that may be received by the control region 114 may be determined based on the user data 602. For example, FIG. 6 illustrates a user interface 104 including a control region 114 and corresponding instructions 202 that include the text "Draw a circle to add to list. Swipe to buy now."

Figure 7:
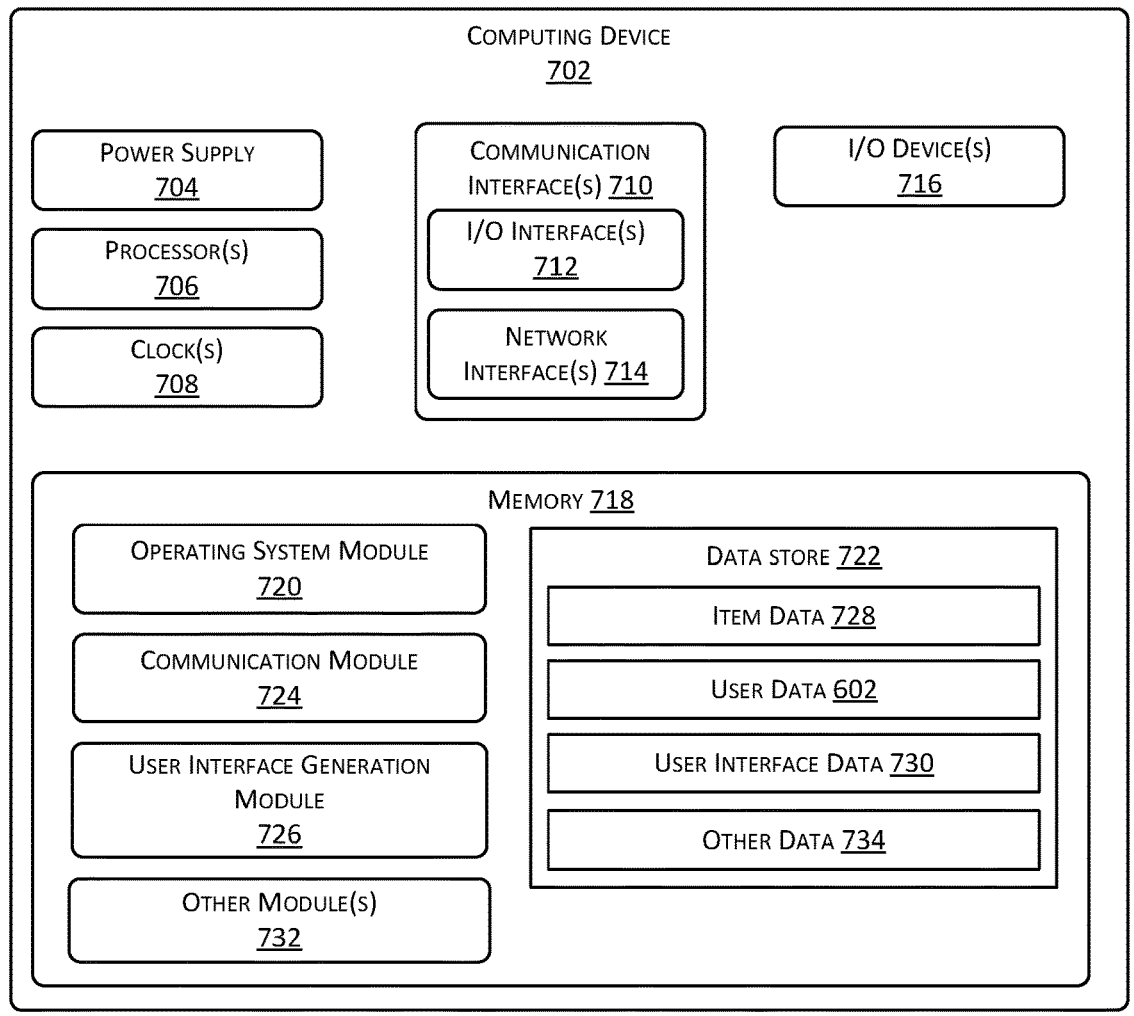
FIG. 7 is a block diagram depicting a computing device within the scope of the present disclosure.

FIG. 7 is a block diagram 700 depicting a computing device 702 within the scope of the present disclosure. The computing device 702 may include, without limitation, one or more servers, personal computers, smartphones or other mobile devices, set-top boxes, tablet computers, wearable computers, automotive computers, and so forth. Additionally, while FIG. 7 depicts a single example computing device 702, in some implementations, computing functions described within the scope of the present disclosure may be performed by multiple computing devices 702, such as a distributed network of computing devices 702.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interface(s) 710, such as input/output (I/O) interface(s) 712, network interface(s) 714, and so forth. The communication interfaces 710 may enable the computing device 702, or components of the computing device 702, to communicate with other computing devices 702 or components thereof. The I/O interface(s) 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O device(s) 716. The I/O devices 716 may include any manner of input device or output device associated with the computing device 702 or with another computing device 702 in communication therewith. For example, I/O devices 716 may include touch sensors, keyboards, mouse devices, microphones, image sensors (e.g., cameras), scanners, displays, speakers, haptic devices, printers, motion sensors, location sensors, and so forth. In some implementations, the I/O device(s) 716 may be physically incorporated with a computing device 702 or may be externally placed.

The network interface(s) 714 may be configured to provide communications between the computing device 702 and other devices, such as the I/O devices 716, routers, access points, wireless communication devices, destination devices, and so forth. The network interface(s) 714 may include devices configured to couple to one or more networks, including local area networks (LANs), wireless LANs, wide area networks (WANs), wireless WANs, and so forth. For example, the network interfaces 714 may include computing devices 702 compatible with Ethernet, Wi-Fi, Wi-Fi Direct, Bluetooth, Bluetooth Low Energy, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD™ operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 stored in the memory 718 may be configured to establish communications with user devices, or other computing devices 702.

The memory 718 may also store a user interface generation module 726. The user interface generation module 726 may be configured to access item data 728 and user interface data 730 indicative of elements and features to include in a user interface, then generate a user interface 104 to be provided to a user device or other computing device 702. Item data 728 may include information indicative of characteristics of one or more items available for purchase. For example, item data 728 may include one or more images 106, descriptions 108, prices 110, ratings 112, and other data indicative of characteristics of items. User interface data 730 may include data indicative of particular elements to be included in a user interface 104, the locations of such elements, one or more layouts, formats, or styles to apply to user interfaces 104, and so forth. For example, the user interface data 730 may include a format associated with the location of one or more elements of item data 728. As another example, the user interface data 730 may include one or more graphical elements that may be used as control regions 114.

In some implementations, the user interface generation module 726 may be configured to access user data 602 and provide a user interface 104 or control region 114 with one or more characteristics based on the user data 602. For example, the user data 602 may include one or more user settings 604 or preferences, demographic data 606, or user interaction data 608. Based on the user data 602, the user interface generation module 726 may generate a control region 114 configured to receive one or more types of user input 102 to perform one or more particular processes. In other implementations, the types of user input 102 and processes associated with the control region 114 may be determined based on default settings.

Other modules 732 may also be present in the memory 718. For example, encryption modules may be used to encrypt and decrypt communications between computing devices 702. User account modules may be configured to receive and process user data 602. Data processing modules may modify, add, or remove elements of item data 728, user data 602, or user interface data 730 to correspond to particular formats usable by the user interface generation module 726. Administrator modules may be used to modify default settings and preferences. Machine learning modules may be configured to determine relationships between user data 602 and the features accessed in user interfaces 104.

Other data 734 within the data store 722 may include default configurations and settings associated with computing devices 702. Other data 734 may also include security data, such as encryption keys and schema, access credentials, and so forth.

In different implementations, different computing devices 702 may have different capabilities or capacities. For example, servers used to provide content to user devices may have significantly more processor 706 capability and memory 718 capacity compared to the processor 706 capability and memory 718 capacity of user devices.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:

providing a user interface to a user device, the user interface including a control region defined by a visual indication of a boundary of the control region, wherein the control region is configured to receive at least a first type of user input including one or more first interactions provided within the boundary and a second type of user input including one or more second interactions provided within the boundary that are different from the one or more first interactions;

responsive to receiving data indicative of the first type of user input within the boundary of the control region from the user device, performing a first action associated with a first process, wherein a second action associated with the first process is configured to be initiated responsive to user input associated with the first action;

responsive to receiving data indicative of a first portion of the second type of user input within the boundary of the control region from the user device, the first portion indicative of partial completion of the second type of user input, performing a second process, the second process including accessing user data associated with the user device; and responsive to receiving data indicative of a second portion of the second type of user input, the second portion indicative of completion of the second type of user input, performing a third process based on at least a portion of the user data.

2. The method of claim 1, wherein:
the first action includes adding an indication of an item to an electronic shopping cart associated with one or more of the user device or a user account;
the second action includes one or more of providing a request for the user data from the user device or initiating a purchase of the item; and
the second process includes initiating the purchase of the item based at least in part on the user data.

3. The method of claim 1, the second process further including:
determining a lack of the user data associated with the user device; and
modifying the second process such that responsive to receiving the second type of user input, the second process further includes providing a request for the user data to the user device.

4. The method of claim 1, further comprising:
responsive to completion of the second process, providing information associated with one or more characteristics of the second process to the user interface;
receiving data indicative of user input associated with the information; and
modifying the one or more characteristics based at least in part on the user input.

5. The method of claim 1, further comprising:
responsive to completion of the second process, providing information associated with the second process to the user interface;
receiving data indicative of user input associated with the information; and
providing a second user interface to the user device, the second user interface configured for receiving user input to modify one or more of: the user data or a characteristic of the second process.

6. The method of claim 1,
wherein the data indicative of the first portion of the second type of user input is received at a first time and the data indicative of the second portion of the second type of user input is received at a second time subsequent to the first time.

7. The method of claim 1, further comprising:
determining the user data for a user account associated with the user device, the user data including an indication of one or more previous processes initiated responsive to user input associated with the user account;
determining one or more of the first process or the second process based on the one or more previous processes initiated responsive to user input associated with the user account; and
in response to the determining of the one or more of the first process or the second process, automatically configuring the control region, based on the user data, to cause performance of the one or more of the first process or the second process.

8. The method of claim 1, further comprising:
determining the user data for a user account associated with the user device, the user data indicating one or more of: a geographic location associated with the user account or a user setting associated with the user account;
determining one or more of the first type of user input or the second type of user input based on the one or more of the geographic location or the user setting; and
in response to the determining of the one or more of the first type of user input or the second type of user input, automatically configuring the control region, based on the user data, to receive the one or more of the first type of user input or the second type of user input.

9. A system comprising:
one or more memories storing computer-executable instructions; and
one or more hardware processors to execute the computer-executable instructions to:
determine a request to access a user interface, the request associated with a user account;
determine user data associated with the user account, wherein the user data indicates one or more of: a previous process or a previous type of user input associated with the user account;
based at least in part on the user data, determine one or more characteristics of a control region to be provided to a user device associated with the user account, wherein the one or more characteristics include receiving one or more of a first type of user input that includes the previous type of user input associated with the user account or causing performance of a first process that includes the previous process associated with the user account;
provide, to the user device, content for inclusion in a user interface, the user interface including the control region, wherein the control region is automatically configured, based on the user data, to receive at least the first type of user input and a second type of user input and to cause performance of one or more of the first process or a third process responsive to receiving the first type of user input and to cause performance of a second process responsive to receiving data indicative of performance of a first portion of the second type of user input and a fourth process responsive to input, wherein the first portion is indicative of partial completion of the second type of user input and the second portion is indicative of completion of the second type of user input;

receive data indicative of one or more of the first type of user input or the second type of user input; and responsive to the data indicative of the one or more of the first type of user input or the second type of user input, perform one or more of the first process, the second process, the third process, or the fourth process.

10. The system of claim 9, wherein the user data includes one or more of a user preference or location information associated with the user account and the computer-executable instructions to determine the one or more characteristics of the control region include computer-executable instructions to:

determine the first type of user input to include a gesture based on the one or more of the user preference or the location information; and based on the user data, configure the control region to accept the first type of user input.

11. The system of claim 9, wherein the user data includes one or more of:

a user preference;

an indication of one or more previous processes initiated responsive to user input associated with the user account;

a purchase history associated with the user account;

a browsing history associated with the user account; or a search history associated with the user account; and the computer-executable instructions to determine the one or more characteristics of the control region include computer-executable instructions to:

determine the first process based on the one or more of the user preference, the indication of the one or more previous processes, the purchase history, the browsing history, or the search history; and based on the user data, configure the control region to cause the first process to be performed responsive to the one or more of the first type of user input or the second type of user input.

12. The system of claim 9, wherein the second type of user input includes a gesture associated with an input device, the user data includes an indication of one or more previous gestures associated with the user account, and the computer-executable instructions to determine the one or more characteristics of the control region include computer-executable instructions to:

determine one or more threshold values associated with the second type of user input based at least in part on the indication of the one or more previous gestures; and configure the control region to determine correspondence between a received user input and the one or more threshold values.

13. The system of claim 9, further comprising computer-executable instructions to:

begin accessing data associated with completion of the second process responsive to receiving the data indicative of the first portion of the second type of user input; and determine that the data indicative of the second portion of the second type of user input is received prior to completing the second process.

14. The system of claim 9, wherein the second type of user input includes a swipe gesture provided using a touch sensor, the system further comprising computer-executable instructions to:

determine a distance associated with the first portion of the second type of user input;

determine the distance associated with the first portion to exceed a threshold value associated with the second type of user input; and perform the second process responsive to receipt of the first portion.

15. The system of claim 9, wherein the user interface includes item data comprising one or more of text data or image data, the item data indicating one or more characteristics of an item, and wherein the control region includes at least a portion of the one or more of the text data or the image data.

16. The system of claim 9, further comprising computer-executable instructions to:

receive data indicative of a third type of user input associated with the control region; and responsive to the third type of user input, modify one or more characteristics of the second process.

17. A system comprising:

one or more memories storing computer-executable instructions; and one or more hardware processors to execute the computer-executable instructions to:

provide a user interface to a user device, the user interface including a control region defined by a boundary that separates the control region from one or more other portions of the user interface;

in response to receiving data indicative of a first type of user input within the boundary, perform a first process, wherein the first type of user input includes a first type of user interaction with the control region;

in response to receiving data indicative of performance of a first portion of a second type of user input within the boundary, the first portion indicative of partial completion of the second type of user input, perform a second process that differs from the first process, wherein the second type of user input includes a second type of user interaction within the control region and the second type differs from the first type; and in response to receiving data indicative of performance of a second portion of the second type of user input, the second portion indicative of completion of the second type of user input, perform a third process that differs from the first process and from the second process.

18. The system of claim 17, further comprising computer-executable instructions to:

determine user data associated with the user device, wherein the user data indicates one or more previous types of user input associated with one or more of the user device or a user account associated with the user data; and based on the user data, automatically configure the control region to receive the first type of user input and the second type of user input, wherein at least one of the first type or the second type is included in the one or more previous types of user input indicated by the user data.

19. The system of claim 17, further comprising computer-executable instructions to:

determine user data associated with the user device, wherein the user data indicates one or more previous processes associated with one or more of the user device or a user account associated with the user data and the first process is included in the one or more previous processes; and based on the user data, automatically configure the control region to perform the first process in response to the first type of user input within the boundary of the control region.

20. The system of claim 17, wherein the second process includes one or more of accessing or generating data associated with performance of the third process.

* * * * *

UNITED STATES PATENT AND TRADEMARK OFFICE
CERTIFICATE OF CORRECTION

PATENT NO. : 10,614,512 B1
APPLICATION NO. : 15/274909
DATED : April 7, 2020
INVENTOR(S) : Kenneth Ryan Ogborn et al.

Page 1 of 1

It is certified that error appears in the above-identified patent and that said Letters Patent is hereby corrected as shown below:

In the Claims

Column 20, Claim 9, Line 63:
Currently Reads: responsive to input
Where it should read: --responsive to receiving data indicative of performance of a second portion of the second type of user input--

Signed and Sealed this
Twenty-sixth Day of May, 2020

Andrei Iancu
*Director of the United States Patent and Trademark Office*